Dec. 29, 1931.  H. F. FISHER  1,838,932
ELECTRICAL TREATER HAVING ELONGATED CIRCULATION PATH AND EDGE EFFECT
Filed Nov. 14, 1927
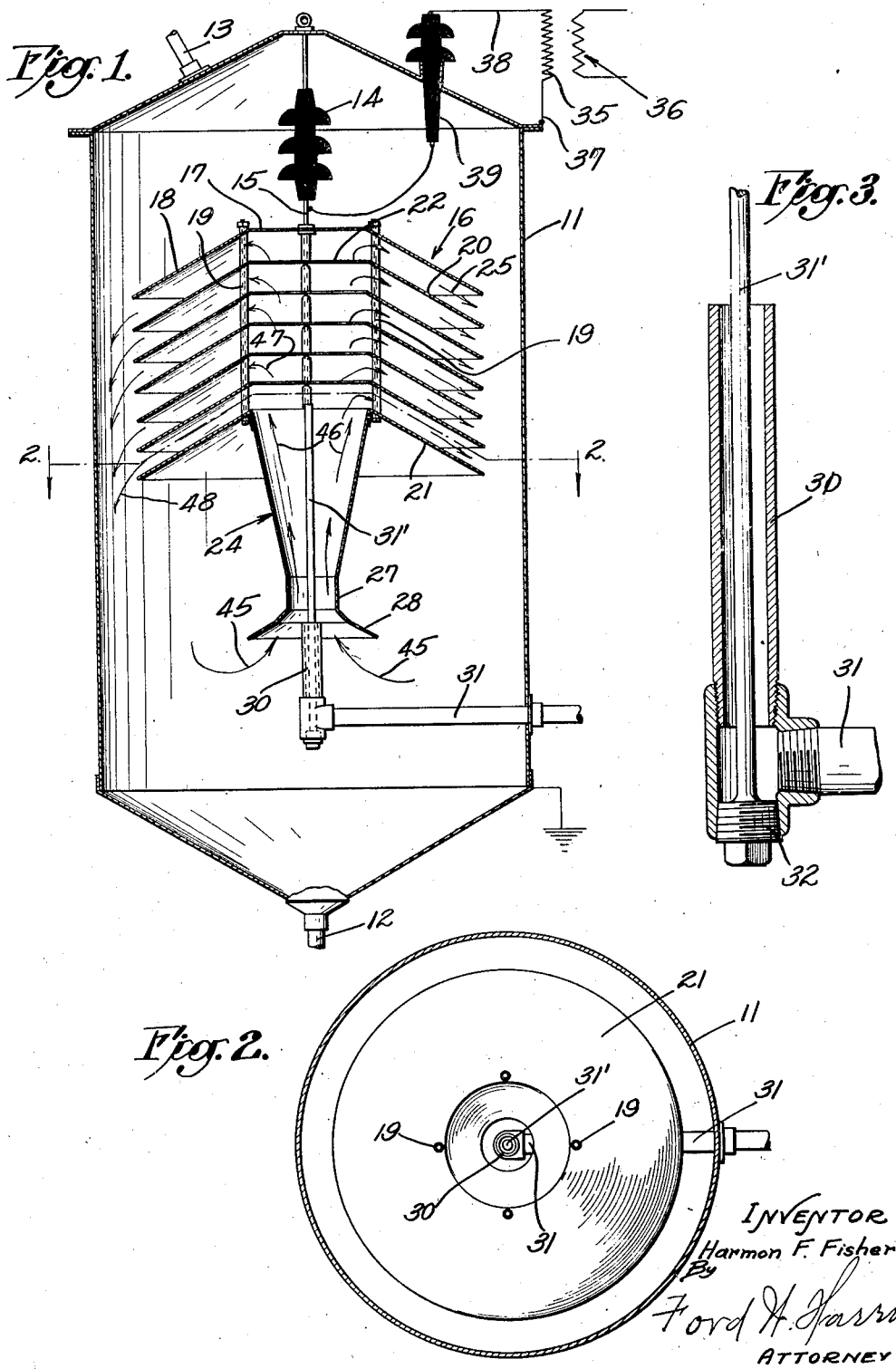

Patented Dec. 29, 1931

1,838,932

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

ELECTRICAL TREATER HAVING ELONGATED CIRCULATION PATH AND EDGE EFFECT

Application filed November 14, 1927. Serial No. 233,291.

This invention has to do with electrical treaters which are used in the various industries for treating mixtures so that one constituent may be readily separated from the other part of the mixture. In view of the fact that this invention finds an extensive use in the petroleum industry, I shall describe a treater adapted for treating petroleum mixtures such as oil and water. I do not intend to limit my invention to this art or to the embodiment illustrated, but wish the invention to be construed in the scope of the appended claims.

The invention has for an object to provide a treater to treat a mixture so that the material which is to be removed will thereafter settle from the other part of the mixture. For example, when using the invention in the petroleum industry the emulsion is treated to coalesce the water particles. The mixture is then passed to the settling zone for the settling of the material (which is, in this case, water) to take place. A part of the suspended material will settle readily but another part of the suspended material may be very reluctant to settle from the other part of the mixture. In the invention the mixture is again treated so that the material still in suspension is agglomerated and will gravitate from the other part of the mixture.

Certain mixtures do not require the high field intensity initial treatment, but are easily separated by an initial settling action and final agglomeration treatment, dispensing with the initial concentrated field treating action.

It is accordingly an object of this invention to provide an apparatus for carrying out this second form of treatment.

Still a further object of my invention is to provide a novel method of treating an emulsion by passing the emulsion through a settling space, and previously or subsequently, or both previously and subsequently, subjecting this emulsion to the action of an electric field.

Other objects and advantages of the invention will be pointed out in the following description.

Referring to the drawings which is for illustrative purposes only:

Fig. 1 is a vertical section through a preferred form of the invention.

Fig. 2 is a horizontal section taken on the line 2—2 of Fig. 1.

Fig. 3 is a fragmentary section illustrating the nozzle utilized in the invention.

In the form of the invention illustrated I provide a tank 11 having a water or precipitate outlet 12 and an oil outlet 13. Supported in the tank 11 is an insulator 14 from which a rod 15 extends. This rod 15 is connected at its lower end to a top baffle 16 having a central part 17 and a surrounding conical baffle part 18. Extending downward from the top baffle 16 are securing bolts 19 which connect intermediate baffles 20 and a lower baffle 21 to the top baffle 16. The intermediate baffles 20 are conical, as illustrated, and have central openings 22. The lower baffle 21 is also conical and is connected to the upper end of a surrounding electrode 24. The baffles 16, 20 and 21 are each separated from each other so as to provide annular settling passages or spaces 25.

The shape of the surrounding electrode 24 is not per se a part of the present invention but is claimed in certain of my copending applications including an application Serial No. 203,253, filed July 2, 1927. I have here illustrated this electrode as being of annular cross section and as having near the lower end thereof a throat 27 below which is an apron 28. Fluid to be treated is introduced into the throat 27 of the surrounding electrode 24 by means of a nozzle 30 which is connected to a fluid inlet pipe 31. This fluid to be treated, which in this assembly of the invention is emulsion, passes upward through the surrounding electrode 24. Extending vertically through the surrounding electrode 24 is a central electrode 31' which is the electrode of highest field intensity. As illustrated in Fig. 3 this central electrode 31' extends upward through the nozzle 30, being carried by a plug 32 attached to the lower end of the nozzle. Neither the nozzle nor the relative shapes of the electrodes 24 and 31 are per se a part of the present invention, being claimed in my application, supra, as well as in my application Serial No. 135,804, filed September 16, 1926.

One side of a secondary 35 of a transformer 36 is connected by a conductor 37 to the tank 11 and consequently to the central electrode 31'. The other side of the secondary 35 is connected by a wire 38 to the baffles 16, 20 and 21, and the surrounding electrode 24, this conductor 38 extending through an insulator inlet bushing 39.

The operation of the invention is as follows:

The fluid to be treated, which in this instance is emulsion, is passed through the fluid supply pipe 31 and is directed by the nozzle 30 into the space between the electrodes 31' and 24 immediately surrounding the central electrode 31' for primary or initial treatment. Previous to this time an electric field has been established between these electrodes by an energization of the transformer 36, and the tank 11 has been filled with a dielectric barrier such as dry or treated oil. In passing through the treating space the emulsion is subjected to the action of an intensified electric field and the water particles are coalesced. Short-circuiting is prevented by a circulation of the dielectric barrier into the treating space around the emulsion, as indicated by arrows 45. The treated emulsion and dielectric barrier pass upward through the treating space as indicated by arrows 46 and pass into the settling passages 25 as indicated by arrows 47. The treated emulsion is caused to flow outward horizontally and in this manner the direction of flow thereof does not interfere with the tendency of the water particles to settle, and, as a matter of fact, helps rather than hinders. For instance, if the treated emulsion passed downward, the flow of the body of emulsion would be in the same direction as the tendency of the particles to settle; consequently the settling action would not be as efficient. The area provided by the settling passages 25 is greater than the area of cross-section of the surrounding electrode 24 so that the rate of flow of the treated emulsion is considerably decreased, and this decrease in rate of flow is very helpful to the settling of the water particles. So also the cross sectional area of said settling passages 25 increases toward the outer ends thereof due to the nested relationship of the baffles. This causes the velocity of the treated emulsion to progressively decrease as it flows outward therethrough, this being conducive to further settling action. The water particles in the individual passages 25 must fall but a short distance in order to reach a collecting surface. The settling speed in the treated emulsion is in certain relation to the distance that the water particles must fall to reach a collecting surface. For instance, if the water particles must fall only two inches to reach a collecting surface, the settling will be substantially twice as fast as where the water particles must fall four inches.

Since the assembly supported by the rod 15 is of a different polarity than the shell 11, there will be electric fields provided between this shell and the annular edges of the baffles 16, 20 and 21. This field has a pronounced edge effect since the field radiates from these edges to the cylindrical wall of the tank 11. Such electric fields are highly concentrated and therefore provide fields of high intensity through which the treated emulsion which passes from the outer ends of the settling passages 25 will pass. Any of the water particles which have not settled from the oil of the treated emulsion will be subjected to the treatment of the edge effects or the electric fields between the baffles and the shell 11. It is found that this secondary treatment has a pronounced agglomerating action on these water particles and they will rapidly settle after passing through this intense field. The treated emulsion passes from the outer parts of the settling passages 25, the water settling downward as indicated by arrows 48. The extremely dry oil will pass upward and be withdrawn from the dry oil outlet 13, however. The water particles which fall from the baffles and the water particles which fall by reason of the agglomerating action of the edge effect fields will fall to the lower part of the tank 11 and be withdrawn through the precipitate outlet 12. The remaining body in the tank, which consists of treated oil having small water content, this body being suitable for a dielectric barrier, passes into the lower end of the surrounding electrodes as indicated by the arrows 45, and is recirculated therethrough by the injector action of the nozzle 30. It will also be noted that the baffle 21, as well as the remainder of the baffles 18 and 20, extend outward from the surrounding electrode to increase the length of the circulation path around the surrounding electrode, thus permitting an increased amount of settling action whereby any water or foreign particles carried by the dielectric barrier may separate therefrom before the dielectric barrier is again drawn into the treating space.

I have thus far illustrated the invention only as being applied to the treatment of an emulsion in which the initial treatment is required. With some emulsions the initial treatment is not required and the central electrode 31' may be dispensed with. When that form of apparatus is used the emulsion passes into the settling spaces 25 without any initial treatment, at which time certain of the water particles will gravitate from the oil of the emulsion. The other water particles retained in the emulsion will still be subjected to the edge effect fields and will be agglomerated so that a settling of these particles from the oil of the emulsion will take place. The electrode 24 will in this instance exert no treating action on the incoming emulsion in the absence of the electrode 31', and thus acts merely as an introducing means for supplying emulsion to the settling space.

The form of the invention illustrated makes it possible to increase the capacity of an ordinary treater many times because it increases the settling rate of the water particles from the oil and therefore an excess of water will not be carried with the dielectric barrier which might result in disruptive arcs in the main treating space between the electrodes 24 and 31'.

Certain of the subject matter of the present application is shown and claimed in an application of Harmon F. Fisher, et al., Serial No. 216,884 filed September 1, 1927, of which the present application is an improvement.

I claim as my invention:

1. An electrical treater consisting of: equipotential separating means in which a material may separate from a mixture; equipotential introducing means for supplying a mixture to said separating means; and agglomerating means into which said mixture passes from said separating means, for agglomerating the unseparated material in said mixture.

2. An electrical treater consisting of: a series of stationary baffles providing one or more equipotential settling passages; introducing means for introducing a mixture into inlet portions of said settling passages; and means forming electric fields at the outlet portions of said baffles.

3. An electrical treater consisting of: a series of stationary baffles providing one or more equipotential settling passages; introducing means for introducing a mixture into inlet portions of said settling passages; a shell adjacent to the outlet portions of said settling passages; and means for setting up an electric field betwen said baffles and said shell.

4. An electrical treater consisting of: a series of baffles providing one or more settling passages; introducing means for introducing a mixture into said settling passages; an electrode in said introducing means; means for establishing an electric field between said introducing means and said electrode; and means forming electric fields at the outlet parts of said baffles.

5. An electrical treater consisting of: a series of baffles providing one or more settling passages; introducing means for introducing a mixture into said settling passages; an electrode in said introducing means; means for establishing an electric field between said introducing means and said electrode; a shell adjacent to the outlet parts of said baffles; and means for setting up an electric field between said baffles and said shell.

6. An electrical treater consisting of: an outer electrode; an inner electrode therewithin; means for creating an electric field between said electrodes; inlet means for supplying a mixture to the space between said electrodes; a plurality of spaced baffles at one end of said outer electrode; a shell surrounding said baffles; and means for establishing an electric field between said shell and the edges of said baffles.

7. An electrical treater consisting of: an outer electrode; an inner electrode therewithin; means for creating an electric field between said electrodes; inlet means for supplying a mixture to the space between said electrodes; a plurality of spaced baffles at one end of said outer electrode, said baffles being conical and lowest at their outer parts; a shell surrounding said baffles; and means for establishing an electric field between said shell and the edges of said baffles.

8. An electrical treater consisting of: a pair of electrodes defining a treating space; means for introducing a fluid to be treated into one end of said treating space; and a plurality of baffles providing a settling means communicating with the other end of said treating space and through which the treated fluid must pass, said settling means increasing in cross-sectional area toward the discharge end thereof to permit a decreased velocity of said treated fluid during its passage therethrough.

9. An electrical treater consisting of: a pair of conical baffles, one of which has a central opening therein, said baffles providing a settling space; a pair of electrodes defining a treating space communicating with said settling space through said opening; and means for supplying fluid to be treated to said treating space.

10. An electrical treater consisting of: a surrounding live electrode; a central grounded electrode, there being a treating space therebetween; and a plurality of baffles electrically connected to said live electrode and defining one or more equipotential settling spaces communicating with said treating space; and means for introducing fluid to be treated into said treating space.

11. A process of treating an emulsion, which includes the steps of: introducing dielectric oil into a space with said emulsion; passing the dielectric oil and emulsion through a settling space; and subsequently passing said dielectric oil and emulsion through an electric field.

12. A process of treating an emulsion, which includes successively passing a continuous stream of emulsion through an initial electric field at a relatively high velocity, through a settling space, and through an auxiliary electric field at a relatively low velocity.

13. A process as defined in claim 12 in which said initial electric field is of relatively higher intensity than said auxiliary electric field.

14. A process of treating an emulsion, which includes the step of successively passing a continuous stream of emulsion through an electric field and through a settling space, the velocity of flow through said settling space progressively decreasing toward the discharge end thereof.

15. An electrical treater consisting of: a tank containing a body of liquid; an electrode structure insulated from said tank and submerged in said body of liquid, said electrode structure providing a surrounding electrode and a plurality of outward-extending baffles electrically connected thereto and providing equipotential settling passages communicating with the interior of said surrounding electrode; a central electrode extending into said surrounding electrode and electrically connected to said tank; and means for introducing the fluid to be treated into said surrounding electrode.

16. A treater comprising a tank, an inner grounded electrode in said tank; a live surrounding electrode around said inner electrode and cooperating therewith in providing a treating space open at its ends; means for establishing a difference of potential between said electrodes, means for circulating a dielectric barrier around said outer electrode and through only the outer portion of said treating space to form a closed circulation path, the inner portion of said treating space containing the fluid to be treated; and a baffle electrically connected to and extending outward from said surrounding electrode in a manner to increase the length of the circulation path therearound, said baffle extending toward said tank whereby an electric field is set up therebetween.

17. In a treater, the combination of: a tank containing a body of liquid; a sleeve electrode suspended in said tank, the ends of said sleeve electrode communicating with said liquid; a central electrode extending into said sleeve electrode; nozzle means electrically connected to said central electrode and surrounding a portion thereof to provide an annular mouth therearound through which a liquid is directed upward into said sleeve electrode in the form of a fluid envelope surrounding said central electrode; and means for forcing liquid through said nozzle under pressure whereby a portion of said body of liquid is moved upward inside said sleeve electrode and downward therearound to set up a circulation path around said sleeve electrode.

In testimony whereof, I have hereunto set my hand at Los Angeles, California, this 9th day of November, 1927.

HARMON F. FISHER.